US 8,259,683 B2

(12) United States Patent
Gundavelli et al.

(10) Patent No.: US 8,259,683 B2
(45) Date of Patent: *Sep. 4, 2012

(54) ATTRIBUTE DRIVEN MOBILE SERVICE CONTROL LOGIC

(75) Inventors: Srinath Gundavelli, San Jose, CA (US); Kent K Leung, Los Altos, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/286,036

(22) Filed: Oct. 31, 2011

(65) Prior Publication Data

US 2012/0047263 A1 Feb. 23, 2012

Related U.S. Application Data

(63) Continuation of application No. 11/408,358, filed on Apr. 21, 2006, now Pat. No. 8,064,399.

(51) Int. Cl.
*H04W 4/00* (2009.01)
*H04W 36/00* (2009.01)

(52) U.S. Cl. ........ 370/331; 370/338; 455/436; 455/437; 455/432.1

(58) Field of Classification Search ................ 370/338, 370/328, 331; 455/436, 437, 438, 439, 432.1
See application file for complete search history.

(56) References Cited

U.S. PATENT DOCUMENTS

| 6,970,693 | B2 | 11/2005 | Madour et al. |
| 7,437,154 | B2 | 10/2008 | Hahn |
| 8,064,399 | B2 * | 11/2011 | Gundavelli et al. ........... 370/331 |
| 2006/0171365 | A1 | 8/2006 | Borella |
| 2007/0206539 | A1 | 9/2007 | Yegani et al. |

OTHER PUBLICATIONS

C. Perkins, Ed. "*IP Mobility Support for Ipv4*," Network Working Group, Nokia Research Center, Aug. 2002 RFC 3344.
US Office Action issued in U.S. Appl. No. 11/408,358 dated Jan. 7, 2010.
US Office Action issued in U.S. Appl. No. 11/408,358 dated Jul. 9, 2010.
US Office Action issued in U.S. Appl. No. 11/408,358 dated Oct. 18, 2010.
US Office Action issued in U.S. Appl. No. 11/408,358 dated Mar. 8, 2011.
US Notice of Allowance issued in U.S. Appl. No. 11/408,358 dated Jul. 8, 2011.

* cited by examiner

*Primary Examiner* — Un C Cho
(74) *Attorney, Agent, or Firm* — Weaver Austin Villeneuve & Sampson LLP (57) ABSTRACT

The disclosed embodiments enable service policies to be provisioned for a Mobile Node dynamically. A network device receives a message including at least one of one or more attributes of a Mobile IP session and one or more user preferences associated with the Mobile Node. One or more rules to be applied to the Mobile Node may then be identified. One or more of the identified rules are executed according to at least one of one or more of the attributes of the Mobile IP session and one or more of the user preferences associated with the Mobile Node.

25 Claims, 9 Drawing Sheets

*FIG. 1*

(Prior Art)

Attribute Examples:

LINK_TYPE = EVDO | 1XRTT | EDGE
PROVIDER = VERIZON | SPRINT | CINGULAR | T-MOBILE
LOCATION = SAN JOSE
DATE_AND_TIME = APRIL-11-2006
EXPENSIVE_LINK = TRUE
GPS_COORDINATES = X, Y
HIGH_BANDWIDTH_LINK = TRUE
DENY_INCOMING_TCP_SESSIONS = FALSE
BLOCK_INCOMING_SMS_TRAFFIC = TRUE

FIG. 4

EXAMPLE CONDITIONS:

IF (PROVIDER = = VERIZON)
IF (EXPENSIVE_LINK = = TRUE)
IF (LOCATION = = SAN JOSE) AND (DATE_AND_TIME = = 1-JAN-2005)
IF (BLOCK_INCOMING_SMS_TRAFFIC = = TRUE)

| CONDITION 702 | ACTION 704 |
|---|---|
| IF (LOCATION = =) SAN JOSE | Deny incoming SIP calls |
| IF (LOCATION = =) SAN JOSE | Block all incoming SMS traffic |
| IF (DATE = = APRIL-9-2006) | Block all incoming voice calls |
| IF (PROVIDER = = SPRINT) | Block all incoming voice calls |

ATTRIBUTE DRIVEN MOBILE SERVICE CONTROL LOGIC

RELATED APPLICATIONS

This application is a continuation application and claims priority to U.S. patent application Ser. No. 11/408,358, entitled "Attribute Driven Mobile Service Control Logic," by Gundavelli et al, filed on Apr. 21, 2006, which is incorporated herein by reference for all purposes.

BACKGROUND OF THE INVENTION

The present invention relates to Mobile IP network technology. More particularly, the present invention relates to dynamically provisioning and providing service control policies to a Mobile Node in a Mobile IP environment.

Mobile IP is a protocol which allows laptop computers or other mobile computer units (referred to as "Mobile Nodes" herein) to roam between various sub-networks at various locations—while maintaining internet and/or WAN connectivity. Without Mobile IP or a related protocol, a Mobile Node would be unable to stay connected while roaming through various sub-networks. This is because the IP address required for any node to communicate over the internet is location specific. Each IP address has a field that specifies the particular sub-network on which the node resides. If a user desires to take a computer which is normally attached to one sub-network and roam with it so that it passes through different sub-networks, it cannot use its home base IP address. As a result, a business person traveling across the country cannot merely roam with his or her computer across geographically disparate network segments or wireless nodes while remaining connected over the internet. This is not an acceptable state-of-affairs in the age of portable computational devices.

To address this problem, the Mobile IP protocol has been developed and implemented. An implementation of Mobile IP is described in RFC 3344 of the Network Working Group, C. Perkins, Ed., "IP Mobility Support for IPv4," August 2002. Mobile IP is also described in the text "Mobile IP Unplugged" by J. Solomon, Prentice Hall. Both of these references are incorporated herein by reference in their entireties and for all purposes.

Figure 1:
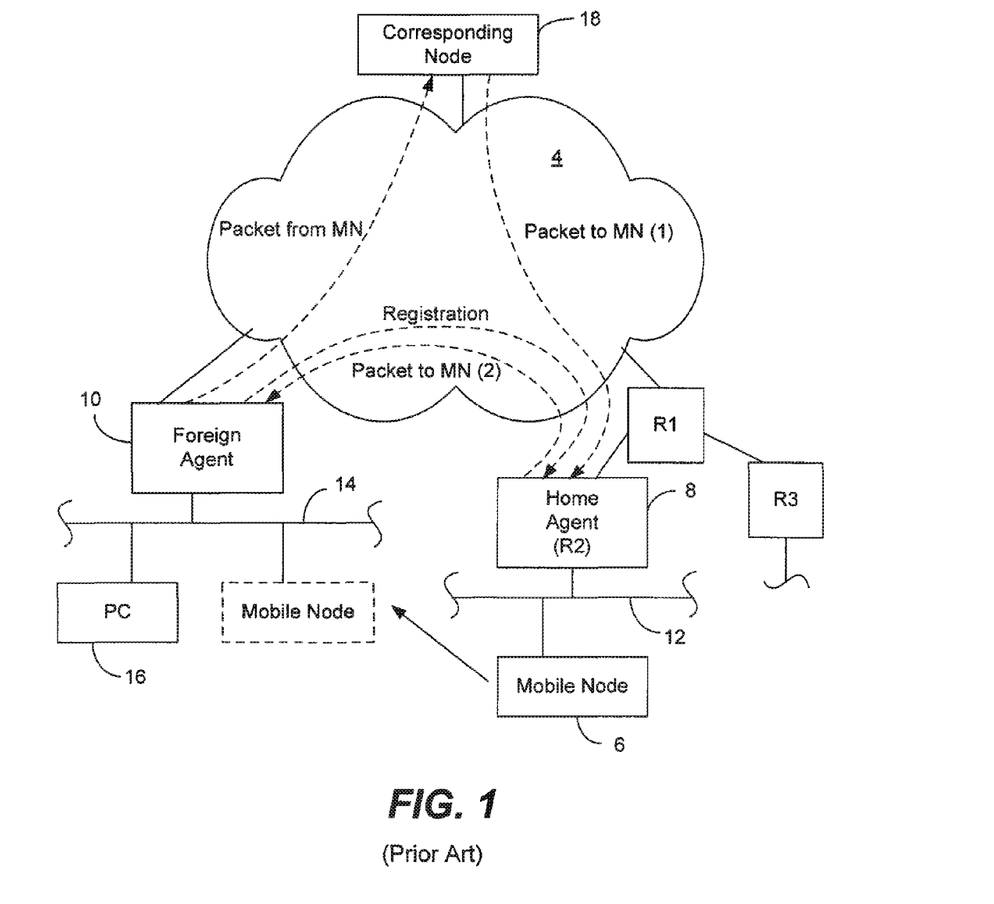
FIG. 1 is a diagram of a Mobile IP network segment and associated environment.

The Mobile IP process in a Mobile IPv4 environment are illustrated in FIG. 1. As shown there, a Mobile IP environment 2 includes the internet (or a WAN) 4 over which a Mobile Node 6 can communicate remotely via mediation by a Home Agent 8 and may also include a Foreign Agent 10. In a Third Generation Partnership Project 2 (3GPP2)/CDMA2000 network, the Foreign Agent is implemented in what is generally referred to as a Packet Data Serving Node (PDSN). In the absence of a Foreign Agent in a Mobile IPv4 environment, or in a Mobile IPv6 environment in which a Foreign Agent is not implemented, the Mobile Node 6 can obtain a topologically correct IP address (i.e., collocated IP address) and register this IP address with the Home Agent. (In a Mobile IPv6 environment, this is accomplished via an Access Router rather than a Foreign Agent.) Typically, the Home Agent and Foreign Agent are routers or other network connection devices performing appropriate Mobile IP functions as implemented by software, hardware, and/or firmware. A particular Mobile Node (e.g., a laptop computer) plugged into its home network segment connects with the internet through its designated Home Agent. When the Mobile Node roams, it communicates via the internet through an available Foreign Agent. Presumably, there are many Foreign Agents available at geographically disparate locations to allow wide spread internet connection via the Mobile IP protocol. Note that it is also possible for the Mobile Node to register directly with its Home Agent.

As shown in FIG. 1, Mobile Node 6 normally resides on (or is "based at") a network segment 12 which allows its network entities to communicate over the internet 4 through Home Agent 8 (an appropriately configured router denoted R2). Note that Home Agent 8 need not directly connect to the internet. For example, as shown in FIG. 1, it may be connected through another router (a router R1 in this case). Router R1 may, in turn, connect one or more other routers (e.g., a router R3) with the internet.

Now, suppose that Mobile Node 6 is removed from its home base network segment 12 and roams to a remote network segment 14. Network segment 14 may include various other nodes such as a PC 16. The nodes on network segment 14 communicate with the internet through a router which doubles as Foreign Agent 10. Mobile Node 6 may identify Foreign Agent 10 through various solicitations and advertisements which form part of the Mobile IP protocol. When Mobile Node 6 engages with network segment 14, Foreign Agent 10 relays a registration request to Home Agent 8 (as indicated by the dotted line "Registration"). The Home and Foreign Agents may then negotiate the conditions of the Mobile Node's attachment to Foreign Agent 10. For example, the attachment may be limited to a period of time, such as two hours. When the negotiation is successfully completed, Home Agent 8 updates an internal "mobility binding table" which specifies the care-of address (e.g., a collocated care-of address or the Foreign Agent's IP address) in association with the identity of Mobile Node 6. Further, the Foreign Agent 10 updates an internal "visitor table" which specifies the Mobile Node address, Home Agent address, etc. In effect, the Mobile Node's home base IP address (associated with segment 12) has been shifted to the Foreign Agent's IP address (associated with segment 14).

Now, suppose that Mobile Node 6 wishes to send a message to a Correspondent Node 18 from its new location. In Mobile IPv4, a message from the Mobile Node is then packetized and forwarded through Foreign Agent 10 over the internet 4 and to Correspondent Node 18 (as indicated by the dotted line "packet from MN") according to a standard internet protocol. If Correspondent Node 18 wishes to send a message to Mobile Node—whether in reply to a message from the Mobile Node or for any other reason—it addresses that message to the IP address of Mobile Node 6 on sub-network 12. The packets of that message are then forwarded over the internet 4 and to router R1 and ultimately to Home Agent 8 as indicated by the dotted line ("packet to MN(1)"). From its mobility binding table, Home Agent 8 recognizes that Mobile Node 6 is no longer attached to network segment 12. It then encapsulates the packets from Correspondent Node 18 (which are addressed to Mobile Node 6 on network segment 12) according to a Mobile IP protocol and forwards these encapsulated packets to a "care of" address for Mobile Node 6 as shown by the dotted line ("packet to MN(2)"). The care-of address may be, for example, the IP address of Foreign Agent 10. Foreign Agent 10 then strips the encapsulation and forwards the message to Mobile Node 6 on sub-network 14. The packet forwarding mechanism implemented by the Home and Foreign Agents is often referred to as "tunneling." In the absence of a Foreign Agent, packets are tunneled directly to the Mobile Node 6 collocated care-of address.

Access Control Lists (ACLs) are often used to control the flow of packets from a particular source and/or addressed to a particular destination. These lists typically include a source address and/or a destination address, and an action to be taken for packets transmitted via the source address and/or addressed to the destination address. In order to implement such ACLs, they must be statically configured on the desired network device. While ACLs are commonly used in a network environment such as a LAN or WAN, conditions change continuously in a mobile environment.

In view of the above, it would be beneficial if a mechanism could be applied that considers the changing conditions that occur in a Mobile IP environment.

SUMMARY OF THE INVENTION

The disclosed embodiments enable service policies for a given Mobile IP session or Mobile Node to be dynamically generated and provisioned by a network device responsible for provisioning service policies to the Mobile Node (e.g., the Mobile Node's Home Agent). This is accomplished, in part, by enabling a mobile network device such as the Mobile Node (and/or its Foreign Agent) to provide information such as information about the Mobile Node's operating environment (e.g., in the form of attributes) and/or user preferences to the network device (e.g., Home Agent). From this information, the network device (e.g., Home Agent) or associated provisioning server may dynamically generate service policies. In this manner, service policies may be provisioned to a Mobile Node dynamically.

In accordance with one embodiment, the network device (e.g., Home Agent) or associated provisioning server is configured with a set of generic rules (i.e., rule templates). Each of these rules may include, for example, a condition/action sequence. The information (e.g., attributes) received from the Mobile Node (and/or its Foreign Agent) for that Mobile IP session can be applied to one or more of these generic rules for generating and provisioning service policies for the Mobile Node. Stated another way, one or more generic rules may be used to generate specific rules to be applied to the Mobile Node using attributes and/or user preferences that have been received.

In accordance with one aspect of the invention, methods and apparatus for provisioning service policies to a Mobile Node include receiving a message including at least one of one or more attributes of a Mobile IP session and one or more user preferences associated with the Mobile Node. One or more rules to be applied to the Mobile Node are identified. One or more of the identified rules are then executed according to at least one of one or more of the attributes of the Mobile IP session and one or more of the user preferences associated with the Mobile Node. In this manner, service policies may be provisioned by applying attributes and/or user preferences to a set of generic rules.

In accordance with one embodiment, one or more specific rules may be generated from the rules to be applied to the Mobile Node and at least one of one or more of the attributes of the Mobile IP session and one or more of the user preferences associated with the Mobile Node. These specific rules may then be executed or, alternatively, the specific rules may be provided to another provisioning network device (e.g., Home Agent) for execution. In other words, the specific rules may be generated and executed by a network device such as a Home Agent or, alternatively, the specific rules may be generated by a provisioning server and provided to a network device such as a Home Agent for execution.

In accordance with another embodiment, a message including one or more attributes of a Mobile IP session and/or one or more user preferences associated with the Mobile Node is composed by a Mobile Node or on behalf of the Mobile Node. The message is then sent to a provisioning network device (e.g., Home Agent), thereby enabling one or more rules to be applied to the Mobile Node to be identified and executed according to one or more of the attributes of the Mobile IP session and/or one or more of the user preferences associated with the Mobile Node.

In accordance with another embodiment, the message is received by a network device such as a Foreign Agent. The Foreign Agent adds one or more additional attributes to the message and sends the message to a second network device, thereby enabling one or more rules to be applied to the Mobile Node to be identified and executed according to at least one of one or more of the attributes of the Mobile IP session and one or more of the user preferences associated with the Mobile Node. For instance, the second network device may be a Home Agent.

In accordance with yet another embodiment, when the Home Agent receives the message including at least one of one or more attributes of a Mobile IP session and one or more user preferences associated with the Mobile Node. The Home Agent identifies one or more rules to be applied to the Mobile Node. The Home Agent may then execute one or more of the identified rules according to at least one of one or more of the attributes of the Mobile IP session and one or more of the user preferences associated with the Mobile Node.

In accordance with another aspect of the invention, the invention pertains to a system operable to perform and/or initiate any of the disclosed methods in a mobile network device (e.g., Mobile Node), Home Agent, Foreign Agent, or provisioning network device. The system includes one or more processors and one or more memories. At least one of the memories and processors are adapted to provide at least some of the above described method operations. In yet a further embodiment, the invention pertains to a computer program product for performing the disclosed methods. The computer program product has at least one computer readable medium and computer program instructions stored within at least one of the computer readable product configured to perform at least some of the above described method operations.

These and other features and advantages of the present invention will be presented in more detail in the following specification of the invention and the accompanying figures, which illustrate by way of example the principles of the invention.

DETAILED DESCRIPTION OF SPECIFIC EMBODIMENTS

Reference will now be made in detail to a specific embodiment of the invention. An example of this embodiment is illustrated in the accompanying drawings. While the invention will be described in conjunction with this specific embodiment, it will be understood that it is not intended to limit the invention to one embodiment. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

Currently, there is no mechanism for a network device such as a Home Agent to provision service policies for nodes (e.g., Mobile Nodes) in a dynamic way based upon session characteristics or other parameters. For instance, a Mobile Node when roaming over a certain Service Provider network may prefer not to receive any SMS messages for cost reasons. Similarly, a Mobile Node when in a given location (or during a given time) may not want to receive calls such as incoming SIP calls. Since these preferences may change periodically and cannot be hard-coded at the Home Agent, the Home Agent cannot deterministically apply these policies on a session by session basis.

The disclosed embodiments enable service policies to be provisioned to a Mobile Node by a network device. This is accomplished by dynamically obtaining user preferences and/or attributes associated with the Mobile IP session. From the dynamically obtained information, service policies may be provisioned for the Mobile IP session based upon the dynamically obtained information.

In accordance with one embodiment, the network device (or associated provisioning server) is configured, either dynamically or statically, with one or more rules. Upon receiving the user preferences and/or attributes associated with the Mobile IP session, the network device executes the rule(s) corresponding to the dynamically received information. More particularly, the network device may receive the rule(s) from the provisioning server and dynamically generate one or more specific rules. In this case, the provisioning server may be provided specific information about the Mobile Node, the Mobile IP session and/or various attributes (e.g., identifying the user, the enterprise, and/or the Service Provider). Alternatively, the network device may receive these specific rules from the provisioning server. In this case, user preferences and/or attributes are provided to the provisioning server. In this manner, service policies may be generated and provisioned dynamically for the Mobile IP session.

Figure 2A:
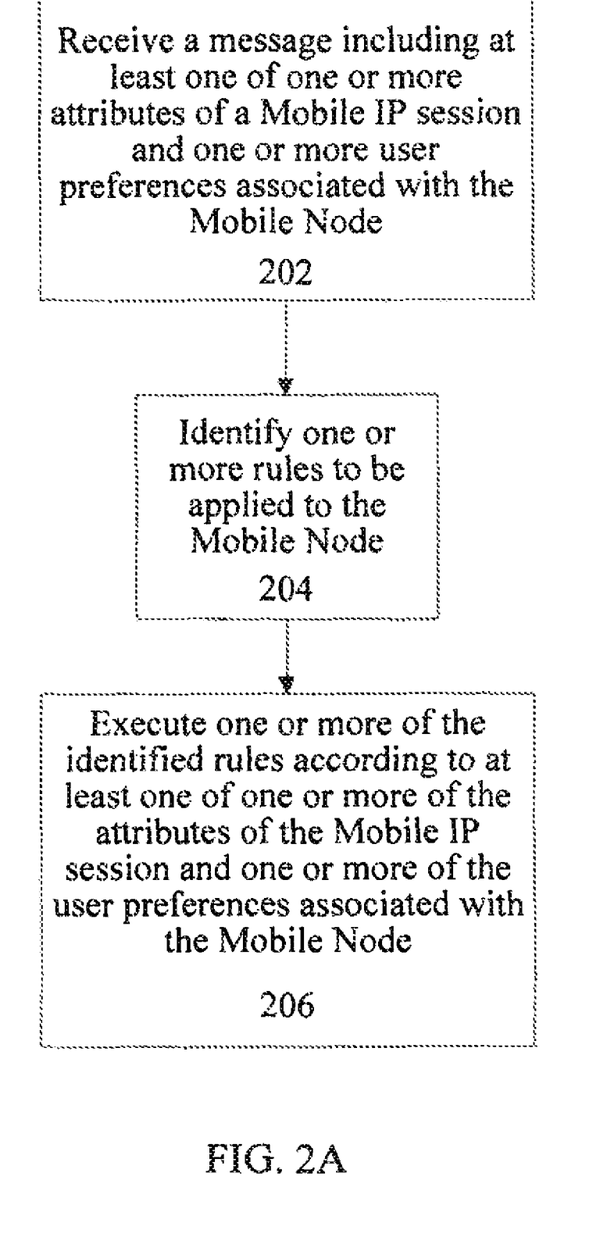
FIG. 2A is a process flow diagram illustrating a general method of provisioning service policies to a Mobile Node in accordance with one embodiment of the invention.

FIG. 2A is a process flow diagram illustrating a general method of provisioning service policies to a Mobile Node in accordance with one embodiment of the invention. As shown at 202, a network device receives a message including at least one of one or more attributes of a Mobile IP session and one or more user preferences associated with the Mobile Node (e.g., the Mobile IP session). The network device may be an entity offering services to the Mobile Node. For instance, the network device may be a Mobile IP mobility agent such as a Home Agent or a Foreign Agent. Exemplary attributes of a Mobile IP session include, but are not limited to, a link type, Service Provider, date, time, and Quality of Service (QoS). User preferences may indicate, for example, the type of traffic the user wishes to receive and/or block.

The message may be sent automatically (e.g., by the Mobile Node) or in response to initiation by a user of the Mobile Node. Moreover, the attribute(s) may be obtained automatically (e.g., by the Mobile Node) and/or in response to user input. Attributes that are obtained automatically may include, for example, a location of the Mobile Node obtained via a Global Positioning System (GPS) module.

In response to the message, it may be desirable to send a reply. For instance such a reply may indicate success or failure of the provisioning of service policies for the Mobile Node (e.g., the requested action(s)). The message may therefore include an error code or otherwise indicate that the requested rule does not exist. Alternatively, the network device may also wish to send a message asynchronously to the sender of the message (e.g., the Mobile Node or Mobile IP mobility agent). For instance, such a message sent by the network device may indicate a change in one or more rules that are configured on the network device, and therefore a change in policy.

One or more rules (i.e., generic rules) to be applied to the Mobile Node are identified at 204. Information provided in the registration request may be used to identify the rules (e.g., rule file) to be applied. For instance, one or more rules associated with the Mobile Node, the Mobile Node's Service Provider, an enterprise network of the Mobile Node, and/or the user of the Mobile Node may be identified. These rules may be identified from a file or table such as that described below with reference to FIG. 7.

Once the rule(s) are identified, one or more of the identified rules may be executed at 206 according to at least one of one or more of the attributes of the Mobile IP session and one or more of the user preferences associated with the Mobile Node. In other words, the generic rules (i.e, generic rule templates) are used to generate the service policies (e.g., specific rules) for the Mobile IP session based upon the specified attributes and/or user preferences. For instance, a rule may include one or more conditions that, when satisfied, causes a particular action or actions to occur. A rule may also be more complex. Execution of a rule may take place automatically upon identification of the rule, or upon a particular occurrence. For instance, a rule may be executed upon receipt of a data packet addressed to the Mobile Node. This may be desirable, for example, to block or prioritize various types of traffic.

In accordance with one embodiment, the message that is received by the network device at 202 is a Mobile IP registration request transmitted during Mobile IP registration. For purposes of the following discussion, the user preferences and/or attributes of the Mobile IP session will be referred to collectively as attributes. These attributes may be transmitted within the Mobile IP registration request. For instance, the attributes may be provided in one or more extensions to the Mobile IP registration request.

Figure 2B:
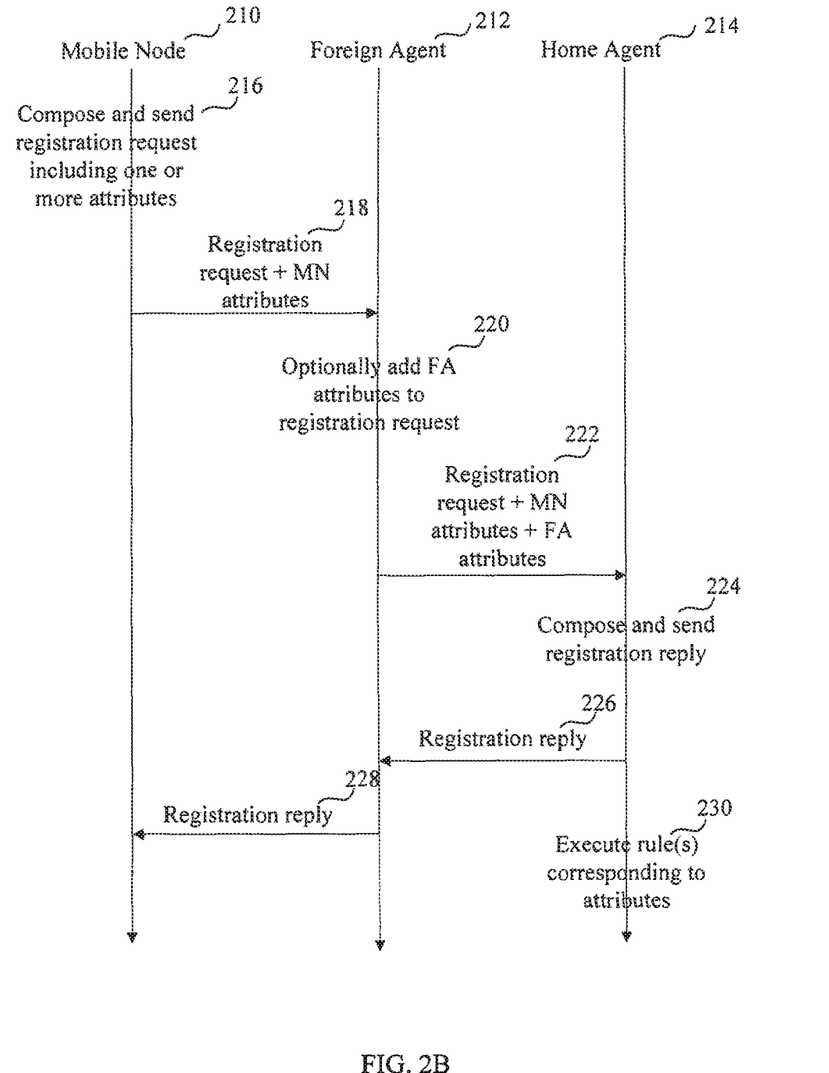
FIG. 2B is a transaction flow diagram illustrating a method of dynamically transmitting user preferences and/or attributes for use in provisioning service policies for a Mobile Node in accordance with one embodiment of the invention.

FIG. 2B is a transaction flow diagram illustrating a method of dynamically transmitting user preferences and/or attributes for use in provisioning service policies for a Mobile Node during Mobile IP registration in accordance with one embodiment of the invention. Steps performed by a Mobile Node, a Foreign Agent, and a Home Agent are represented by vertical lines 210, 212, and 214, respectively. The Mobile Node composes and sends a registration request, which may include one or more attributes (MN attributes) at 216. The registration request is sent along with the attributes provided by the Mobile Node at 218. Upon receiving the registration request, the Foreign Agent (if present) may also add one or more attributes (FA attributes) to the registration request at 220 and send the registration request to the Home Agent at 222. For example, these attributes may be obtained by the Foreign agent from its visitor table or AAA server. Alternatively, it is possible to compose a registration request on behalf of the Mobile Node (e.g., where the node does not support Mobile IP). For instance, the registration request may be composed on behalf of a node by an Access Point or Foreign Agent.

Upon receiving the registration request, the Home Agent may "add" additional attributes associated with the Mobile Node (or session). For instance, the Home Agent may access information via a AAA server. Upon authentication of the registration request, the Home Agent composes and sends a registration reply at 224 indicating success or failure of the registration of the Mobile Node with the Home Agent. The registration reply may also indicate success or failure of the provisioning of service policies for the Mobile Node. The registration reply is then transmitted to the Foreign Agent (if present) at 226 and ultimately to the Mobile Node at 228 (assuming that the Mobile Node supports Mobile IP, and has composed the registration request packet that has been sent).

Assuming that registration is successful, the Home Agent (or separate provisioning server) may access the service profile for the Mobile Node and apply the attributes supplied in the registration request in determining the service control logic and for provisioning the traffic policies for the Mobile Node traffic flows. More particularly, the Home Agent may identify one or more rules to be applied to the Mobile Node (e.g., which may be applied to all Mobile Nodes equally or may be associated with the Mobile Node) and execute one or more of the identified rules according to one or more of the attributes at 230. In other words, the generic rules (i.e, generic rule templates) are used to generate the service policies (e.g., specific rules) for the Mobile IP session based upon the specified attributes. Execution of the rule(s) may occur automatically, or in response to a particular event. For instance, one or more of the identified rules may be executed when a data packet addressed to the Mobile Node is received by the Home Agent. This may be desirable, for example, to block or prioritize traffic in accordance with the rule(s).

Figure 3A:
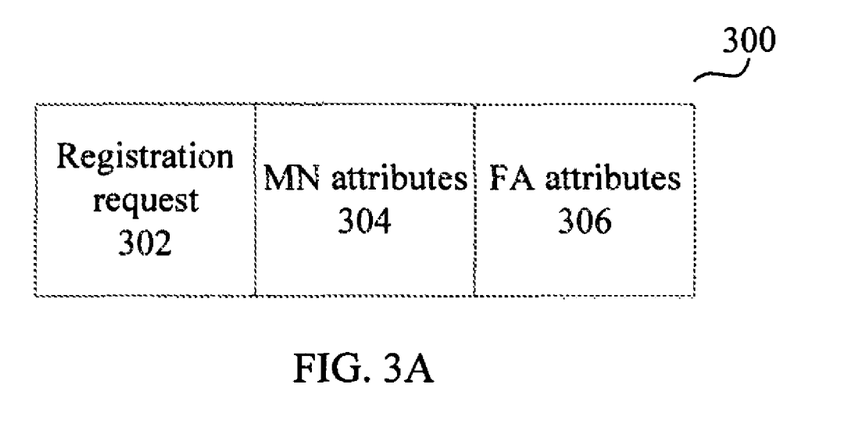
FIG. 3A is a diagram illustrating an exemplary registration request message that may be transmitted in accordance with one embodiment of the invention.

FIG. 3A is a diagram illustrating an exemplary registration request message that may be transmitted in accordance with one embodiment of the invention. As shown at 300, a registration request may include a Mobile IP registration request packet 302, as well as attributes provided by the Mobile Node (MN) (shown as MN attributes) 304 and/or attributes provided by a Foreign Agent (or other entity) (shown as FA attributes) 306. The MN attributes 304 and/or FA attributes 306 may be implemented as one or more extensions to the registration request.

Figure 3B:
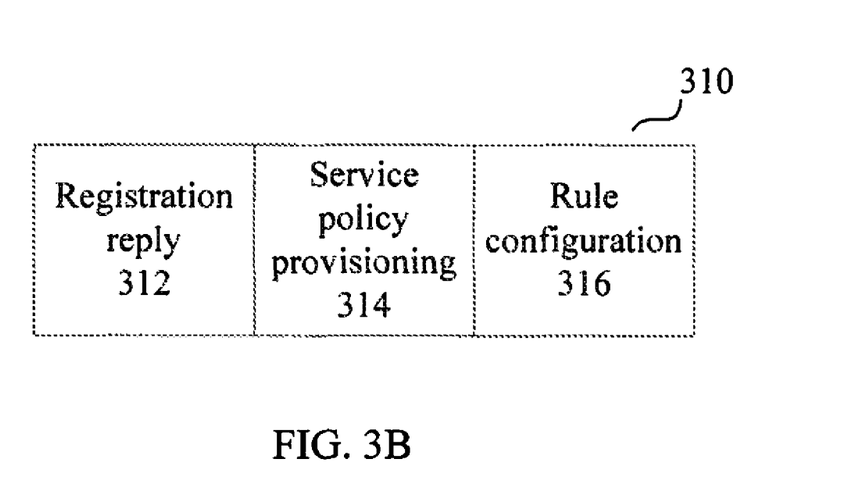
FIG. 3B is a diagram illustrating an exemplary registration reply message that may be transmitted in accordance with one embodiment of the invention.

FIG. 3B is a diagram illustrating an exemplary registration reply message that may be transmitted in accordance with one embodiment of the invention. As shown at 310, a registration reply may include a Mobile IP registration reply packet 312, as well as one or more extensions. For instance, in this example, an optional service policy provisioning extension 314 may indicate whether the provisioning of service policies as indicated or requested by the registration request 300 is successful. Other extensions such as a rule configuration extension 316 may indicate whether the rules configured on the Home Agent have been reconfigured and/or may indicate specific configuration changes. For instance, the rule configuration extension 316 may indicate or include one or more rules to be applied to the Mobile Node. These rules may be generic rules or one or more specific rules that have been generated from the rules based upon the attributes provided in the registration request message. In this manner, the Mobile Node (and other network devices receiving the registration reply) may be notified of the service policies to be applied to the Mobile Node.

Figure 4:
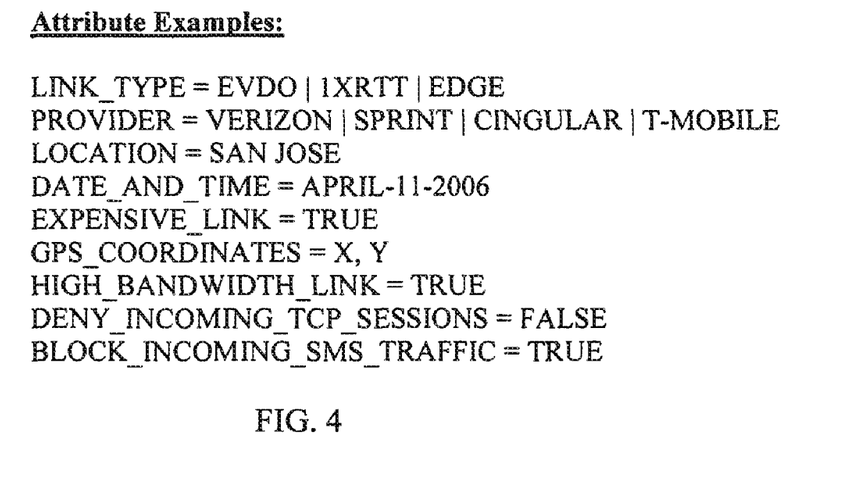
FIG. 4 is a diagram illustrating exemplary attributes that may be transmitted in a message such as a registration request in accordance with one embodiment of the invention.

As described above, attributes of a Mobile IP session and/or user preferences may be specified as "attributes." Each attribute may have a name, data type, and possible values. The source of the attribute (e.g., Mobile Node, Foreign Agent, AAA server, or Home Agent) may also be indicated either explicitly or implicitly. FIG. 4 is a diagram illustrating exemplary attributes that may be transmitted in a message such as a registration request in accordance with one embodiment of the invention. As shown, exemplary attributes are shown with their possible values or actual values. These attributes include the link type indicating the type(s) of link being used by or available to the Mobile Node, the provider identifying the Service Provider used by or available to the Mobile Node, location of the Mobile Node, and date and/or time of the communication/registration request. Other attributes may indicate whether the link is an "expensive" link, GPS coordinates of the location of the Mobile Node, and the type of incoming sessions or traffic to be denied or blocked. For instance, incoming TCP sessions may be denied by setting the DENY_INCOMING_TCP_SESSIONS attribute to TRUE. Similarly, incoming SMS traffic may be blocked by setting the BLOCK_INCOMING_SMS_TRAFFIC to TRUE.

Figure 5:
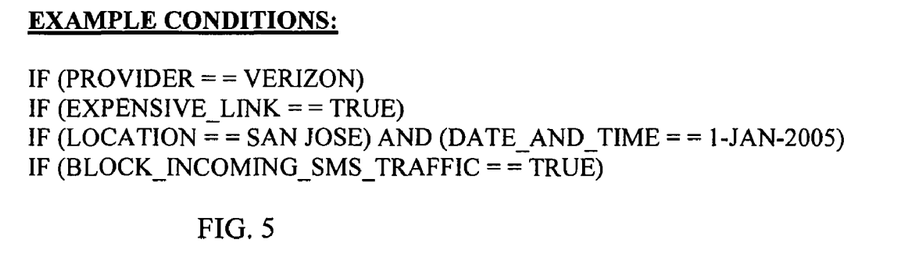
FIG. 5 is a diagram illustrating exemplary conditions that may be applied based upon values of attributes transmitted in a message such as a registration request in accordance with one embodiment of the invention.

FIG. 5 is a diagram illustrating exemplary conditions that may be applied based upon values of attributes transmitted in a message such as a registration request in accordance with one embodiment of the invention. In the first example, the condition is satisfied if the Service Provider is Verizon. The second exemplary condition is satisfied if the link is an expensive link. The third condition is satisfied when the location of the Mobile Node is San Jose and the date is Jan. 1, 2005. The final condition is satisfied when the value of the BLOCK_INCOMING_SMS_TRAFFIC attribute is set to TRUE.

Figure 6:
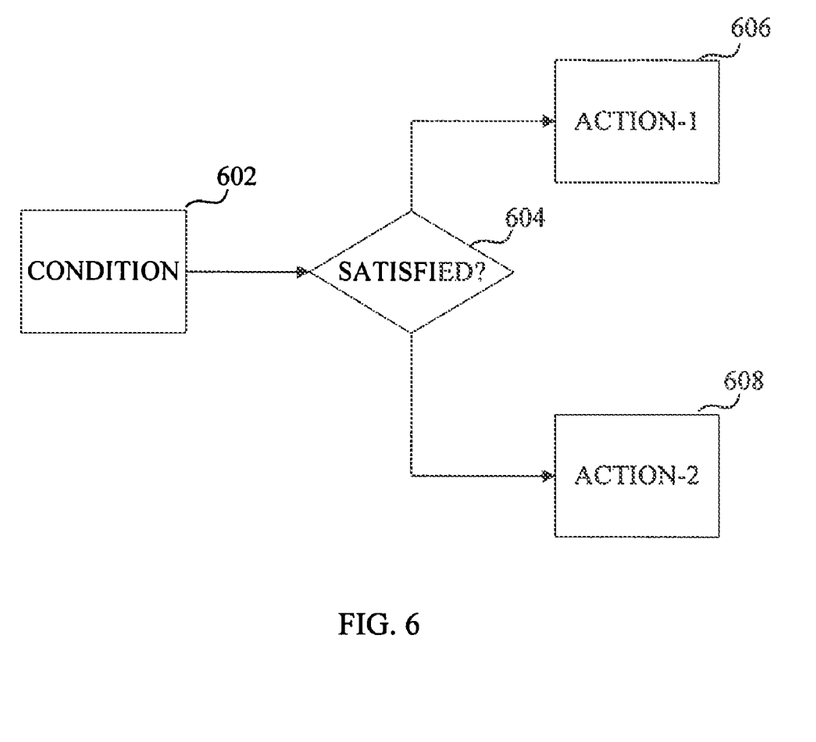
FIG. 6 is a diagram illustrating an exemplary condition-action flow representing the application of a rule in accordance with one embodiment of the invention.

FIG. 6 is a diagram illustrating an exemplary condition-action flow representing the application of a rule in accordance with one embodiment of the invention. When the condition 602 is satisfied 604, a first action, ACTION-1, may be executed at 606. However, when the condition 602 is not satisfied at 604, a second action, ACTION-2, may be executed at 608. For instance, the actions may be actions applied to traffic to and/or from the Mobile Node. For instance, it may be desirable to deny SMS traffic when the LOCATION of the Mobile Node is "San Jose." As another example, incoming TCP sessions may be denied when the LINK_TYPE is "1xRTT."

Figure 7:
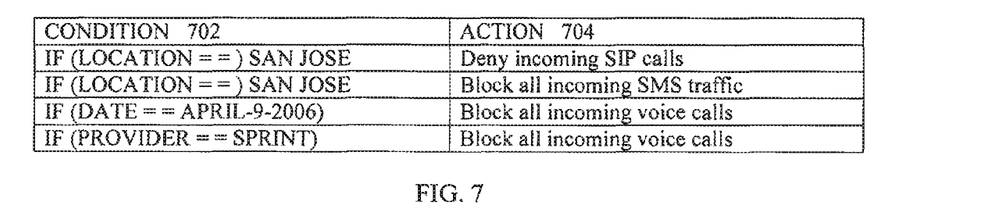
FIG. 7 is a diagram illustrating exemplary rules that may be stored in a file or table in accordance with one embodiment of the invention.

As set forth above, the provisioning network device (e.g., Home Agent) or associated server is configured with a set of "generic" rules that serve as a template for generating the specific service policy for a particular Mobile Node or Mobile IP session. FIG. 7 is a diagram illustrating exemplary rules that may be stored in a file or table in accordance with one embodiment of the invention. As shown in this example, a rule may include a condition 702 and action 704 performed upon satisfaction of the condition. For instance, in accordance with the exemplary rule, when the LOCATION of the Mobile Node is "San Jose," incoming SIP calls are denied. Thus, the traffic policies that are provisioned at the end of the registration are determined based upon the rules and the supplied attributes. In this manner, service control logic for the Mobile IP session may be generated from the rules in accordance with the supplied attributes.

The rules that are configured at the Home Agent or associated provisioning server may be configured statically or dynamically. For instance, a Mobile Node or operator may define service control rules and push them to the Home Agent (e.g., by sending a message dynamically to the Home Agent). The rules may be stored in one or more files or tables. Therefore, it may be desirable to statically or dynamically add, remove or modify one or more files/tables. In this manner, the rules may be modified periodically.

The apparatus (e.g. Mobile Node, Foreign Agent, Home Agent, or provisioning network device) of this invention may be specially constructed for the required purposes, or may be a general-purpose programmable machine selectively activated or reconfigured by a computer program stored in memory. The processes presented herein are not inherently related to any particular router or other apparatus. In a preferred embodiment, any of the Home Agents of this invention may be specially configured routers such as specially configured router models 1700, 1800, 2500, 2600, 3200, 3600, 4000, 4500, 4700, 7200, and 7500 available from Cisco Systems, Inc. of San Jose, Calif. A general structure for some of these machines will appear from the description given below.

Generally, the techniques of the present invention may be implemented on software and/or hardware. For example, it can be implemented in an operating system kernel, in a separate user process, in a library package bound into network applications, on a specially constructed machine, or on a network interface card. In a specific embodiment of this invention, the technique of the present invention is implemented in software such as an operating system or in an application running on an operating system.

A software or software/hardware hybrid system of this invention is preferably implemented on a general-purpose programmable machine selectively activated or reconfigured by a computer program stored in memory. Such programmable machine may be a network device designed to handle network traffic. Such network devices typically have multiple network interfaces including frame relay, ISDN, and wireless interfaces, for example. Specific examples of such network devices include routers and switches. For example, the roaming systems of this invention may be specially configured routers such as specially configured router models 350, 1100, 1200, 1400, 1600, 2500, 2600, 3200, 3600, 4500, 4700, 7200, 7500, and 12000 available from Cisco Systems, Inc. of San Jose, Calif. A general architecture for some of these machines will appear from the description given below. In an alternative embodiment, the registration system may be implemented on a general-purpose network host machine such as a personal computer or workstation. Further, the invention may be at least partially implemented on a card (e.g., an interface card) for a network device or a general-purpose computing device.

Figure 8:
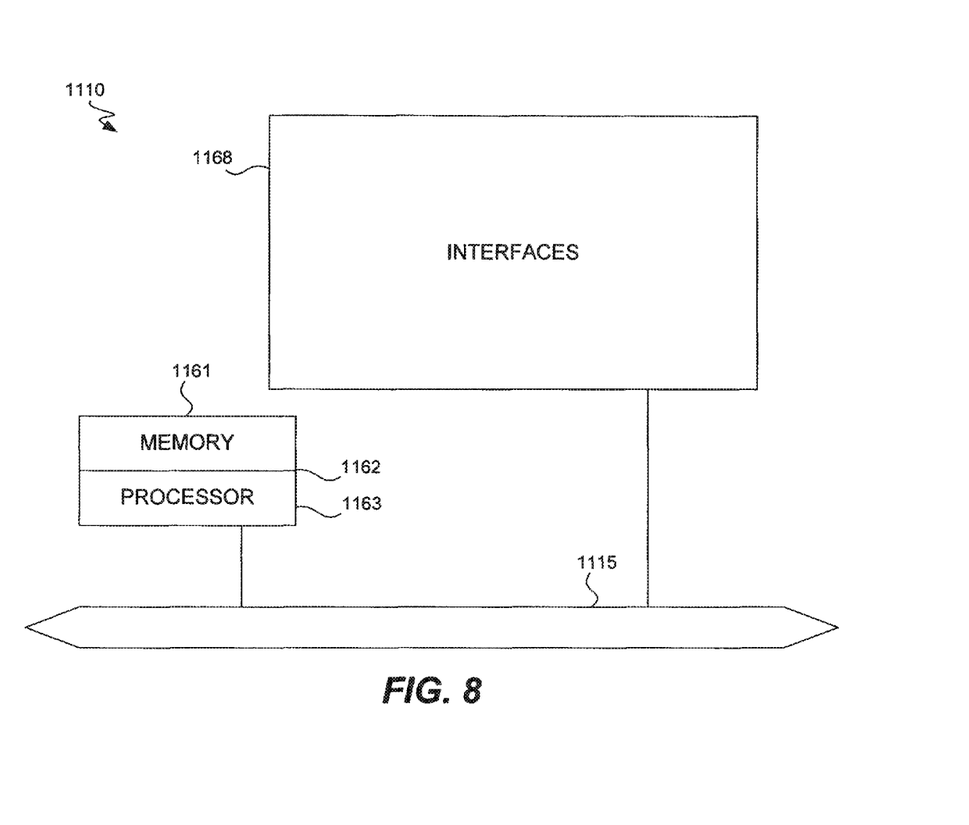
FIG. 8 is a diagrammatic representation of a router in which embodiments of the present invention may be implemented.

Referring now to FIG. 8, a router 1110 suitable for implementing the present invention includes a master central processing unit (CPU) 1162, interfaces 1168, and a bus 1115 (e.g., a PCI bus). When acting under the control of appropriate software or firmware, the CPU 1162 is responsible for such router tasks as routing table computations and network management. It may also be responsible for updating mobility binding and visitor tables, etc. It preferably accomplishes all these functions under the control of software including an operating system (e.g., the Internetwork Operating System (IOS®) of Cisco Systems, Inc.) and any appropriate applications software. CPU 1162 may include one or more processors 1163 such as a processor from the Motorola family of microprocessors or the MIPS family of microprocessors. In an alternative embodiment, processor 1163 is specially designed hardware for controlling the operations of router 1110. In a specific embodiment, a memory 1161 (such as non-volatile RAM and/or ROM) also forms part of CPU 1162. However, there are many different ways in which memory could be coupled to the system.

The interfaces 1168 are typically provided as interface cards (sometimes referred to as "line cards"). Generally, they control the sending and receiving of data packets over the network and sometimes support other peripherals used with the router 1110. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 1162 to efficiently perform routing computations, network diagnostics, security functions, etc.

Although the system shown in FIG. 8 is one specific router of the present invention, it is by no means the only router architecture on which the present invention can be implemented. For example, an architecture having a single processor that handles communications as well as routing computations, etc. is often used. Further, other types of interfaces and media could also be used with the router.

Regardless of the network device's configuration, it may employ one or more memories or memory modules (including memory 1161) configured to store program instructions for the general-purpose network operations and mechanisms for authentication and registration functions described herein. The program instructions may control the operation of an operating system and/or one or more applications, for example. The memory or memories may also be configured to store tables such as mobility binding, registration, and association tables, etc.

Because such information and program instructions may be employed to implement the systems/methods described herein, the present invention relates to machine-readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). The invention may also be embodied in a computer-readable medium in which a carrier wave travels over an appropriate medium such as airwaves, optical lines, electric lines, etc. Examples of program instructions include both machine code, such as produced by a compiler, and files containing higher level code that may be executed by the computer using an interpreter.

Although the foregoing invention has been described in some detail for purposes of clarity of understanding, it will be apparent that certain changes and modifications may be practiced within the scope of the appended claims. Moreover, although the example described refers primarily to IPv4, the present invention may be used with other versions of IP, such as IPv6. Thus, the terms registration request and registration reply are intended to cover other registration messages in other versions of Mobile IP, such as Mobile IPv6 Binding Update and Binding Acknowledgement messages. Therefore, the described embodiments should be taken as illustrative and not restrictive, and the invention should not be limited to the details given herein but should be defined by the following claims and their full scope of equivalents.

What is claimed is:

1. An apparatus, comprising:
   a processor; and
   a memory, at least one of the processor or the memory being adapted for:
   receiving by a network device a Mobile IP registration request having one or more extensions, the one or more extensions including at least one of one or more attributes of a Mobile IP session, wherein the at least one of the one or more attributes include a first set of one or more attributes provided in at least one of the extensions of the Mobile IP registration request by a Mobile Node supporting Mobile IP;
   identifying by the network device one or more rules to be applied to the Mobile Node; and
   generating by the network device one or more specific rules from the rules to be applied to the Mobile Node based, at least in part, upon the at least one of the one or more attributes of the Mobile IP session, wherein each of the one or more specific rules blocks or prioritizes a subset of traffic of the Mobile Node during the Mobile IP session when the one or more specific rules are executed;
   wherein the extensions are not authentication extensions.

2. The apparatus as recited in claim 1, at least one of the processor or the memory being further adapted for performing steps further comprising:
   providing the specific rules to another provisioning network device or executing one or more of the specific rules.

3. A non-transitory computer-readable medium storing thereon computer-readable instructions, comprising:
   instructions for processing a Mobile IP registration request received by a network device, the Mobile IP registration request having one or more extensions, the one or more extensions including at least one of one or more attributes of a Mobile IP session, wherein the at least one of the one or more attributes include a first set of one or more attributes provided in at least one of the extensions of the Mobile IP registration request by a Mobile Node supporting Mobile IP;
   instructions for identifying by the network device one or more rules to be applied to the Mobile Node; and
   instructions for generating by the network device one or more specific rules from the rules to be applied to the Mobile Node based, at least in part, upon the at least one of the one or more attributes of the Mobile IP session, wherein each of the one or more specific rules blocks or prioritizes a subset of traffic of the Mobile Node during the Mobile IP session when the one or more specific rules are executed;
   wherein the extensions are not authentication extensions.

4. The non-transitory computer-readable medium as recited in claim 3, further comprising:
   instructions for providing the specific rules to another provisioning network device or executing one or more of the specific rules.

5. An apparatus, comprising:
   a processor; and
   a memory, at least one of the processor or the memory being adapted for:
   receiving by a network device a Mobile IP registration request having one or more extensions from a Mobile Node supporting Mobile IP, the one or more extensions including at least one of one or more attributes of a Mobile IP session, wherein the at least one of the one or more attributes include a first set of one or more attributes provided in at least one of the extensions of the Mobile IP registration request by the Mobile Node;
   appending by the network device one or more additional extensions including a second set of one or more additional attributes to the Mobile IP registration request; and
   sending by the network device the Mobile IP registration request to a second network device after appending the one or more additional extensions to the Mobile IP registration request, thereby enabling one or more rules to be applied to the Mobile Node to be identified and executed according to the attributes of the Mobile IP session, wherein the one or more rules are executed to block or prioritize traffic of the Mobile Node during the Mobile IP session according to the first set of one or more attributes and the second set of one or more additional attributes of the Mobile IP session;
   wherein the one or more extensions and the one or more additional extensions are not authentication extensions.

6. The apparatus as recited in claim 5, wherein the network device is a Foreign Agent and the second network device is a Home Agent.

7. A non-transitory computer-readable medium storing thereon computer-readable instructions, comprising:
   instructions for processing by a network device a Mobile IP registration request received from a Mobile Node supporting Mobile IP;
   instructions for appending by the network device a first set of one or more extensions including a first set of one or more attributes of a Mobile IP session to the Mobile IP registration request; and
   instructions for sending by the network device the Mobile IP registration request to a second network device after appending the first set of one or more extensions to the Mobile IP registration request, thereby enabling one or more rules to be applied to the Mobile Node to be identified and executed according to the attributes of the Mobile IP session, wherein the one or more rules are executed to block or prioritize traffic of the Mobile Node during the Mobile IP session according to the attributes;
   wherein the first set of one or more extensions are not authentication extensions.

8. The non-transitory computer-readable medium as recited in claim 7, wherein the Mobile IP registration request that has been received from the Mobile Node includes a second set of one or more extensions, the second set of one or more extensions including a second set of one or more attributes of the Mobile IP session.

9. The non-transitory computer-readable medium as recited in claim 8, wherein at least one of the second set of one or more attributes have been provided in at least one of the second set of extensions of the Mobile IP registration request by the Mobile Node.

10. The non-transitory computer-readable medium as recited in claim 7, wherein the network device is a Foreign Agent and the second network device is a Home Agent.

11. An apparatus, comprising:
a processor; and
a memory, at least one of the processor or the memory being adapted for:
composing by a network device a message including at least one of one or more attributes of a Mobile IP session or one or more user preferences associated with a Mobile Node supporting Mobile IP, wherein the network device is the Mobile Node; and
sending the message by the network device to a provisioning network device, thereby enabling one or more rules to be applied to the Mobile Node to be identified and executed according to at least one of one or more of the attributes of the Mobile IP session or one or more of the user preferences associated with the Mobile Node, wherein the one or more rules are executed in order to block or prioritize traffic of the Mobile Node during the Mobile IP session according to at least one of the one or more attributes of the Mobile IP session or one or more of the user preferences associated with the Mobile Node;
wherein the extensions are not authentication extensions.

12. The apparatus as recited in claim 11, wherein the message is a Mobile IP registration request and wherein composing the message comprises appending one or more extensions to the Mobile IP registration request such that the one or more extensions include the at least one of one or more attributes of the Mobile IP session or one or more user preferences associated with the Mobile Node.

13. The apparatus as recited in claim 11, wherein the provisioning network device is a Home Agent or Foreign Agent.

14. The apparatus as recited in claim 11, at least one of the processor or the memory being further adapted for performing steps, comprising:
receiving the one or more user preferences from a user.

15. The apparatus as recited in claim 14, wherein the one or more user preferences indicate that the user of the Mobile Node does not wish to receive a type of traffic, wherein the type of traffic is voice or SMS.

16. The apparatus as recited in claim 11, at least one of the processor or the memory being further adapted for performing steps, comprising:
automatically obtaining the at least one of one or more attributes of the Mobile IP session.

17. The apparatus as recited in claim 11, wherein the at least one of the one or more attributes of the Mobile IP session comprise a type of incoming sessions to be denied or blocked, or a type of traffic to be denied or blocked.

18. A non-transitory computer-readable medium storing thereon computer-readable instructions, comprising:
instructions for composing by a network device a message including at least one of one or more attributes of a Mobile IP session or one or more user preferences associated with a Mobile Node supporting Mobile IP, wherein the network device is the Mobile Node; and
instructions for sending the message by the network device to a provisioning network device, thereby enabling one or more rules to be applied to the Mobile Node to be identified and executed according to at least one of one or more of the attributes of the Mobile IP session or one or more of the user preferences associated with the Mobile Node, wherein the one or more rules are executed in order to block or prioritize traffic of the Mobile Node during the Mobile IP session according to at least one of the one or more attributes of the Mobile IP session or one or more of the user preferences associated with the Mobile Node;
wherein the extensions are not authentication extensions.

19. The non-transitory computer-readable medium as recited in claim 18, wherein the message is a Mobile IP registration request and wherein composing the message comprises appending one or more extensions to the Mobile IP registration request such that the one or more extensions include the at least one of one or more attributes of the Mobile IP session or one or more user preferences associated with the Mobile Node.

20. The non-transitory computer-readable medium as recited in claim 18, wherein traffic of the Mobile Node is blocked or prioritized during the Mobile IP session according to at least one of the one or more attributes of the Mobile IP session or one or more of the user preferences associated with the Mobile Node.

21. The non-transitory computer-readable medium as recited in claim 18, wherein the provisioning network device is a Home Agent or Foreign Agent.

22. The non-transitory computer-readable medium as recited in claim 18, further comprising:
instructions for obtaining the one or more user preferences from a user.

23. The non-transitory computer-readable medium as recited in claim 22, wherein the one or more user preferences indicate that the user of the Mobile Node does not wish to receive a type of traffic, wherein the type of traffic is voice or SMS.

24. The non-transitory computer-readable medium as recited in claim 18, further comprising:
instructions for automatically obtaining the at least one of one or more attributes of the Mobile IP session.

25. The non-transitory computer-readable medium as recited in claim 18, wherein the at least one of the one or more attributes of the Mobile IP session comprise a type of incoming sessions to be denied or blocked, or a type of traffic to be denied or blocked.

* * * * *